UNITED STATES PATENT OFFICE.

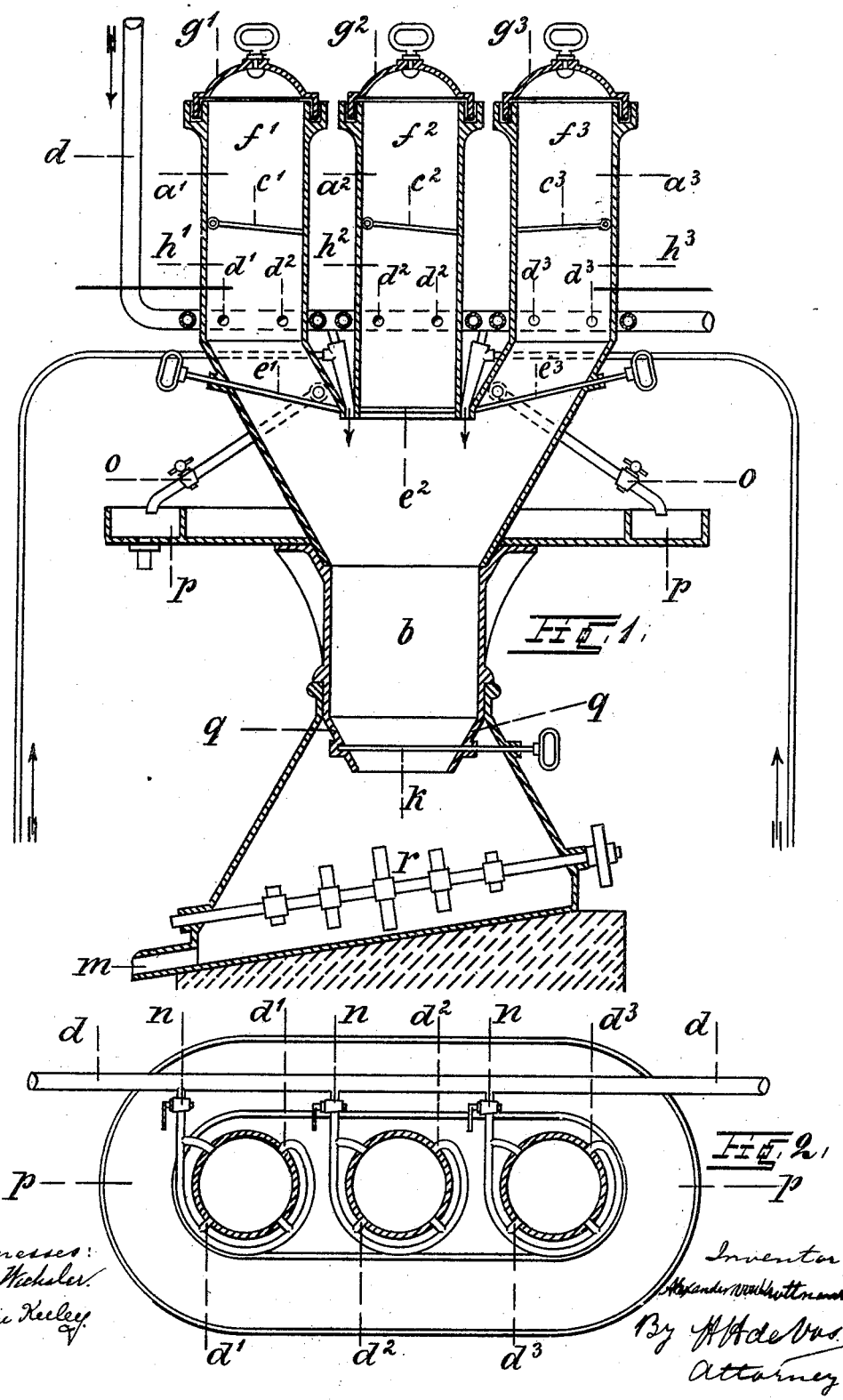

ALEXANDER VON KROTTNAURER, OF AUSSIG, AUSTRIA-HUNGARY.

APPARATUS FOR MAKING FERTILIZERS.

No. 802,996.     Specification of Letters Patent.     Patented Oct. 31, 1905.

Application filed December 4, 1903. Serial No. 183,699.

*To all whom it may concern:*

Be it known that I, ALEXANDER VON KROTTNAURER, a subject of the German Emperor, residing at Aussig-on-the-Elbe, Kingdom of Bohemia, Austria-Hungary, have invented a certain new and useful Apparatus for Extracting Fat from Refuse Matter and for Converting the Same into Fertilizers, of which the following is a specification.

This invention has reference to an apparatus for removing the fat or grease from refuse matter and for converting the same into fertilizers, the apparatus being distinguished from the old apparatus heretofore employed for the same purpose by the several raw materials being submitted separately to separate steaming processes, so that the apparatus is capable of turning out a fertilizer of a certain fertilizing value without difficulty and in a continuous operation and by the use of but small quantities of steam and of acid.

Heretofore the raw materials employed in the manufacture of fertilizer—such as meat, leather, felt refuse, bones, and the like—were steamed in one and the same room, and they were then treated with acid, the steaming being effected for the purpose of facilitating the action of the acid and for accelerating the same. The duration of the steaming process, however, is governed by the nature of the substances. Thus the time required for the steaming of meat, for instance, is considerably less than that required for the treatment of leather. Hence there is an unnecessary waste of steam and of time by steaming meat and leather in one and the same room until the leather has also acquired the proper condition for the subsequent treatment with acid. On the other hand, there is a waste of time and of acid if the steaming of the said mixture is only carried on up to the proper degree of steaming of the meat, for in this case the insufficiently-prepared leather requires more time for the action of the acid, or a stronger acid has to be used than is required for the conversion of the meat, and then the meat becomes too acid and the acid must be removed again. For the practical utilization of the fertilizer obtained from refuse matter the costs of production are a point of chief importance in order to be able to compete with the natural-manure and with mineral fertilizers. Besides, it is of essential importance that in the process as carried out with my improved apparatus the percentage of nitrogen of the raw materials employed is maintained as nearly as possible, so that one is enabled to fix the percentage of nitrogen in the fertilizer in the process of manufacture already by a proper selection of the raw materials. In the same manner the operator is at liberty to manufacture a fertilizer which, besides showing a certain percentage of nitrogen, possesses a certain percentage of phosphate of lime, since for this purpose it is only necessary to charge one of the separate rooms with bones in the required proportion. All these conditions are not attained by the apparatus heretofore employed in a satisfactory manner, while the desired object is accomplished by my apparatus in a simple and still very efficient manner.

On the accompanying drawing, showing an embodiment of my invention, the new apparatus is represented in a preferred form of construction in vertical section and in top plan view diagrammatically.

The apparatus comprises three vertical cylinders $a'\ a^2\ a^3$, which are separate from each other and which are united at the bottom by one common cylinder $b$, from which they may be separated by closing devices, such as slides $e'\ e^2\ e^3$. Each of the three cylinders $a'\ a^2\ a^3$ can be charged with a different kind of raw material, and for this purpose it is of advantage to provide special filling-rooms $f'\ f^2\ f^3$ in the upper parts of the said cylinders, the said filling-rooms being actuated by flaps $c'\ c^2\ c^3$, operated from without, and being closed by covers $g'\ g^2\ g^3$, placed on top of the cylinders and the rims of which are preferably embedded in water or in sand.

Steam-pipes $d'\ d^2\ d^3$ admit steam into the drum-shaped parts of the cylinders, which I will call "steam-spaces" $h'\ h^2\ h^3$, and between the flaps and the slides $c'\ e'\ c^2\ e^2\ c^3\ e^3$, respectively, and nozzles $i\ i$ enter the cylinder $b$, which constitutes the decomposition-chamber, the nozzles serving for injecting the required acid, such as sulfuric acid, nitric acid, and hydrochloric acid, or several of these acids. At the bottom the cylinder $b$ is closed by a slide $k$, and it flares out into a funnel which leads into the mixing-chamber $l$, which may be heated, if desired, and in which the mass charged into it may, if desired, be subjected to the action of a stirring device before the mass is discharged through the exit-opening $m$.

Assuming, for instance, that the cylinder $a'$ serves for the reception of the leather refuse, the cylinder $a^2$ for the felt and wool refuse, and the room $a^3$ for bones and meat refuse, each of the filling or charging rooms $f'\ f^2\ f^3$ after the closing of the flaps $c'\ c^2\ c^3$ and the removal of the covers $g'\ g^2\ g^3$ is charged with the raw products mentioned in such proportions as will be required by the percentage of nitrogen, of phosphates, and of other salts on which the value of the fertilizer depends which the fertilizer to be manufactured is to contain. After the charging is finished the cylinders are closed by putting the covers on, and the flaps $c'\ c^2\ c^3$ are opened. The raw materials are then submitted in the steaming-chambers $h'\ h^2\ h^3$ to the action of steam of different pressure and regulated by the proper adjustment of the steam-admission cocks $n$, Figure 2, the pressure of the steam being so regulated for each cylinder that the materials in the different steaming-chambers become softened approximately at the same time, excepting bones, of course. By this steaming process the fat or grease separates with the water of condensation above the slides $e'\ e^2\ e^3$, which form the bottoms of the steaming-chambers, the fat being allowed to run out into a common gutter $p$ by opening the cocks $o$ after the raw materials have been sufficiently steamed, the fat, with the water of condensation, being then discharged from the gutter $p$. The fat, grease, and oil are then separated from the condense-water and are then submitted to further treatment. As soon as steam escapes through the discharge-cocks $o$ the steam-admission passages $d$ are closed, and the steamed raw materials are now not only prepared for the quick and comparatively uniform absorption of the acid, but they are also freed from the excess of moisture, so that the acids, which are now made to act upon the materials, are capable of acting upon the softened raw materials in the desired concentration, though they are used but in small quantities. After the slides $e'\ e^2\ e^3$ have been opened the steamed and thoroughly-softened raw materials drop from the cylinders $h'\ h^2\ h^3$ into the common collecting-chamber $b$ and fill it up, while at the same time acid of the required concentration is injected upon the descending mass and preferably by means of injectors, which are operated by steam from the steam-pipe $d$. Thus the said acid is distributed in a spray, and since, as already mentioned, the steamed raw materials are freed from the excess of water it is possible to arrive at a quick decomposition of the materials with a considerably-smaller quantity of acid than heretofore, inasmuch as the materials having been previously thoroughly softened will take up the acid rapidly, and therefore become rapidly decomposed also. The steam of the injector in this operation has also a solvent action upon the new compounds now formed, without, however, forming a too liquid paste, which would necessitate considerable evaporation, such as is the case in the well-known apparatus for the manufacture of fertilizers. This evaporating of the fertilizer masses obtained for the purpose of imparting to them a condition for easy transportation, such as reducing them to the state of a dry powder, is an essential source of deficiencies in view of the fertilizer mass losing nitrogen by evaporation by the escaping ammonia, and this the more so the more vigorous the evaporating and drying process has to be carried on. In the new apparatus this drawback is entirely obviated, or it is reduced, at least, to a minimum. The steam, which is saturated with finely-distributed particles of acid, carries the acid quickly to all parts of the softened raw materials and permeates the same in a state only very slightly diluted beyond the required degree. Hence the product is also decomposed very rapidly, so that taking regard of the required temperature these compounds are in a warm solution in the decomposition-chamber, while when the mass is cooled down they constitute a solid product and which can be easily dried.

When the mass in the chamber $b$ after being acidified is dissolved and has been converted into a thick paste-like mass, the slide $k$ is opened either entirely or so much only that the mass can now flow down slowly into the mixing-chamber $l$ through the funnel $q$. While this takes place the steamed raw materials descend gradually into the chamber $b$ from the cylinders $a'\ a^2\ a^3$, and in their descent they are covered with a fine spray of acid, so that by a proper adjustment of the size of the discharge-opening of the funnel $q$, which may be easily controlled by the proper adjustment of the slide $k$, the decomposition of the descending already-steamed raw materials is taking place continuously. In the meantime the charging-chambers $f'\ f^2\ f^3$ have been charged again with suitable raw materials, the cylinders $a'\ a^2\ a^3$ having been closed by their covers. The flaps $c'\ c^2\ c^3$ are preferably provided with openings which allow the entrance of steam into the charging-chambers from the steam-chambers situated below the same; but in case the said openings are dispensed with the flaps as a rule do not close so tightly as not to allow the steam to leak through at the sides, the steam effecting a previous heating of the materials contained in the charging-chambers $f'\ f^2\ f^3$ and facilitating the subsequent steaming process, so that after the emptying of the steaming-chambers $h'\ h^2\ h^3$ and upon the refilling of the same after the closing of the slides $e'\ e^2\ e^3$ it takes but little time to carry out the complete steaming in the chambers referred to. The separation of the charging-chambers from the steaming-chambers is for the purpose of being able to effect the charging of the apparatus without being annoyed by the developing vapors, for though steam is free to enter from the steaming-chamber into the charging-chamber still it acts only as a preliminary heating means and it is condensed wholly or the greater part of it is condensed upon the cooler raw materials.

The mass which has been decomposed and converted into a paste becomes more and more mixed through in its descent, and when it is at last discharged through the opening of the funnel $q$ and the escape-opening of the mixing-chamber $l$ it is so thoroughly mixed that further mixing of the same is unnecessary. Still a mixing device $r\ r$ may be provided in the said mixing-chamber $l$. Windows are provided in the walls of the steaming-chambers and in the decomposition-chamber and allow of watching the proper procedure of the operation. If from a test of a sample of the finished fertilizer it is found not to contain the desired amount of nitrogen, of phosphoric acid, and of other constituents, the charge of the cylinder which carries the corresponding raw material is increased.

It is of course unnecessary to use all the cylinders $a'\ a^2\ a^3$ only as steaming-chambers for the raw materials; but for some purposes it may be preferable also to use one or the other of the cylinders simultaneously or exclusively as a decomposition-chamber. This becomes necessary, for instance, if rather large quantities of bones have to be treated besides other refuse matter. In this case it will be preferable to charge the cylinder $a^3$ only with bones, and instead of steam comparatively strong acid is injected into the chamber $h^3$ and in this chamber the dissolving of the phosphate of lime and of the glue is effected, and this solution is then allowed to flow down through the uncovered opening of the slide $e^3$ into the decomposing-chamber $b$ and into the steamed raw materials which are contained in the same. A fourth cylinder may even be added to the apparatus, this additional cylinder being, for instance, filled with powdered Thomas slags or with superphosphate, the said materials being then introduced into the decomposing-chamber in case the raw materials under treatment should be deficient in the required percentage of plant-foods. The general construction of the apparatus is not changed thereby, for it is obviously immaterial for the invention whether the apparatus is provided with only three cylinders, as shown in the drawings, or with more cylinders which are united by one common decomposing-chamber.

What I claim, and desire to secure by Letters Patent of the United States, is—

In an apparatus of the character set forth, the combination of a mixing-chamber having a contracted upper portion, a collecting-chamber mounted within the upper contracted portion of the mixing-chamber, having a funnel-shaped lower portion, a slide member mounted within the funnel portion, an enlarged hopper-shaped member mounted at the upper portion of the collecting-chamber and a series of separate cylinders mounted above said upper portion adapted to discharge material at corresponding points within the hopper, and slides controlling the discharge-openings of said cylinders, substantially as described.

In witness whereof I have hereunto set my hand in presence of two witnesses.

ALEX. VON KROTTNAURER.

Witnesses:
 PAUL E. SCHILLING,
 PAUL ARRAS.